Aug. 11, 1925.

A. O. GROVEN

SAFETY LOCK

Filed May 11, 1925

1,548,879

Inventor
Albert O. Groven

By C.A.Snow&Co
Attorneys

Patented Aug. 11, 1925.

1,548,879

UNITED STATES PATENT OFFICE.

ALBERT O. GROVEN, OF GRAFTON, NORTH DAKOTA.

SAFETY LOCK.

Application filed May 11, 1925. Serial No. 29,583.

*To all whom it may concern:*

Be it known that I, ALBERT O. GROVEN, a citizen of the United States, residing at Grafton, in the county of Walsh and State of North Dakota, have invented a new and useful Safety Lock, of which the following is a specification.

The device forming the subject matter of this application is a safety lock or link adapted to be used on anti-skid chains of the kind employed on vehicle wheels. The invention aims to provide a lock or connecting link which will not become unlocked, regardless of the direction in which the wheel which carries the anti-skid chain is rotating.

It is within the province of the disclosure to improve generally and to enhance the utility of devices of that type to which the invention appertains.

A preferred form of the invention has been shown in the drawings, but it will be understood that a mechanic, working within the scope of what is claimed, may make such changes as his skill may suggest, without departing from the spirit of the invention.

In the drawings:—

Figure 1:
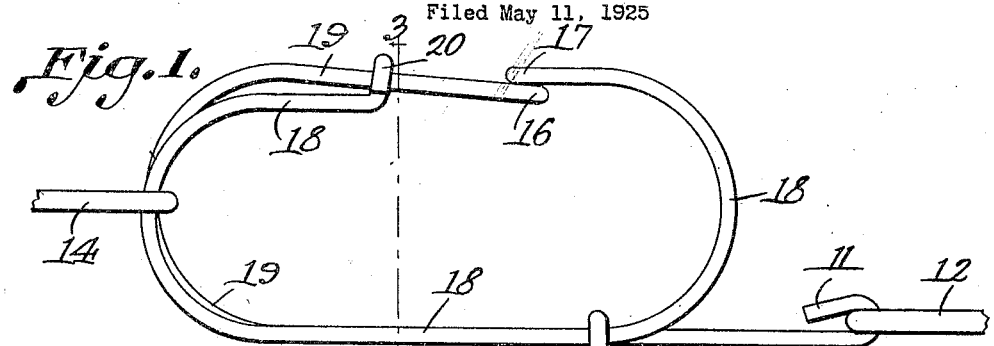
Figure 1 shows in side elevation, a device constructed in accordance with the invention, a link being closed.
Figure 2:
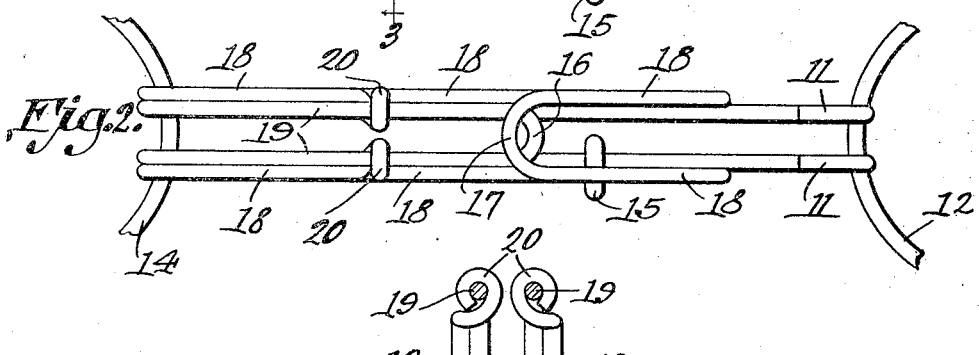
Figure 2 is a top plan of the structure shown in Figure 1.
Figure 3:
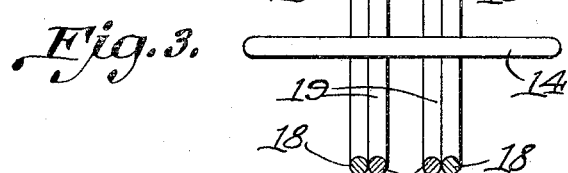
Figure 3 is a cross section on the line 3—3 of Figure 1.
Figure 4:
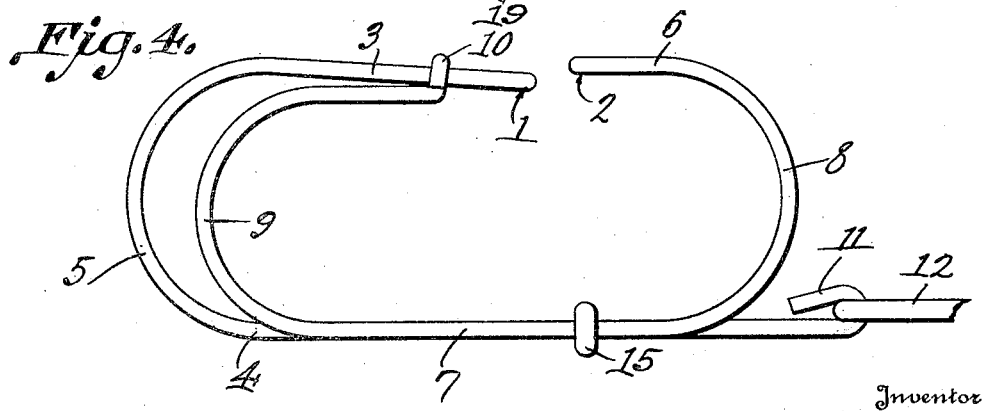
Figure 4 is a side elevation wherein the link has been opened.

The device forming the subject matter of this application comprises a first hook 1 and a second hook 2. The first hook 1 includes a bill 3, a shank 4, and a primary bend 5 connecting the bill and the shank. The second hook 2 includes a bill 6, a shank 7, and a primary bend 8 connecting the bill and the shank. The shank 7 of the second hook 2 is prolonged to form a secondary bend 9 corresponding generally in shape to the primary bend 5 of the first hook 1, the secondary bend having means 10 for engaging the bill 3 of the first hook slidably, to permit an opening and a closing of the link. The shank 4 of the primary hook 1 is extended beyond the primary bend 8 of the hook 2 and terminates in means 11, such as hooks, adapted to engage one part 12 of an anti-skid chain. The secondary bend 9 of the hook 2 and the primary bend 5 of the hook 1 are adapted to be located side by side, to receive another link 14 of the anti-skid chain. The shank 7 of the hook 2 is slidably connected with the shank 4 of the hook 1, by a means indicated at 15.

In a more detailed description, the hook 1 is fashioned from a U-shaped strip 16, and the hook 2 is fashioned from a U-shaped strip 17, the strip 17 having side arms 18, and the strip 16 having side arms 19, the side arms forming the bills, the shanks and the bends of the respective hooks. The side arms 19 of the strip 16 lie throughout a portion of their length between the side arms 18 of the strip 17, as clearly shown in the drawings. The means indicated at 10, generally, may be in the form of eyes 20 cooperating with and receiving the parts 19 slidably, the eyes 20 being located on the parts 18. The element indicated at 15 may be in the form of a ring, slidable upon one of the arms 18 and the corresponding arm 19.

Having thus described the invention, what is claimed is:—

1. A device of the class described, comprising first and second hooks, each including a bill, a shank, and a primary bend connecting the bill with the shank; the hooks being so placed with respect to each other as to form a link for which the bills cooperate to form a closure, the shank of the second hook being prolonged to form a secondary bend corresponding generally in shape to the primary bend of the first hook, the secondary bend having means for engaging the bill of the first hook slidably, to permit an opening and a closing of the link, the shank of the primary hook having means for engaging one of two parts to be connected, the secondary bend of the second hook and the primary bend of the first hook being located side by side to receive the other of two parts to be connected, and means for effecting a slidable connection between the shanks of the hooks.

2. A device of the class described, constructed as set forth in claim 1, and further characterized by the fact that each hook is fashioned from a U-shaped strip including side arms, the side arms forming the bills, shanks and bends of the hooks, the side arms of the said strip of the primary hook lying throughout a portion of their length between the side arms of the said strip of the secondary hook.

In testimony that I claim the foregoing as my own, I have hereto affixed my signature in the presence of two witnesses.

ALBERT O. GROVEN.

Witnesses:
K. R. THORSTENSON,
IDA MIDGARDEN.